United States Patent
Youngberg et al.

(10) Patent No.: US 10,395,041 B1
(45) Date of Patent: Aug. 27, 2019

(54) METHODS AND SYSTEMS FOR REDUCING FALSE POSITIVE FINDINGS

(71) Applicant: Capital One Services, LLC, McLean, VA (US)

(72) Inventors: Adam Youngberg, Allen, TX (US); David Filbey, Plano, TX (US); Kishore Prabakaran Fernando, Little Elm, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/177,236

(22) Filed: Oct. 31, 2018

(51) Int. Cl.
   *G06F 21/57* (2013.01)
   *G06F 11/36* (2006.01)
   *G06F 21/56* (2013.01)

(52) U.S. Cl.
   CPC ........ *G06F 21/577* (2013.01); *G06F 11/3608* (2013.01); *G06F 11/3664* (2013.01); *G06F 11/3692* (2013.01); *G06F 21/563* (2013.01); *G06F 2221/033* (2013.01)

(58) Field of Classification Search
   CPC .................................................. G06F 21/577
   See application file for complete search history.

(56) References Cited

U.S. PATENT DOCUMENTS

| | | | |
|---|---|---|---|
| 9,418,230 B2 | 8/2016 | Archer et al. | |
| 9,589,560 B1* | 3/2017 | Vitaladevuni | G06K 9/6277 |
| 2006/0124726 A1* | 6/2006 | Kotovich | G06Q 20/04 235/379 |
| 2007/0162761 A1* | 7/2007 | Davis | G06Q 10/00 713/182 |
| 2016/0099963 A1* | 4/2016 | Mahaffey | H04L 63/0227 726/25 |
| 2019/0065833 A1* | 2/2019 | Wang | G06K 9/00288 |

FOREIGN PATENT DOCUMENTS

WO 2016018289 A1 2/2016

* cited by examiner

*Primary Examiner* — Simon P Kanaan
(74) *Attorney, Agent, or Firm* — Troutman Sanders LLP; Christopher J. Forstner; John A. Morrissett

(57) ABSTRACT

A system for validating software security analysis findings includes a non-transitory computer readable medium and a processor. The non-transitory computer readable medium stores a source truth dataset including criteria for validating characteristics of findings. The processor receives a finding from a software security analysis tool that performs scan on application code. The processor identifies a characteristic from the finding. The processor selects a criterion from the non-transitory computer readable medium for validating the identified characteristic. The processor determines a validity score for the finding based on whether the selected criterion is met. The processor determines whether the finding is false positive by comparing the validity score to a predetermined validity threshold. If the finding is true positive, a graphical user interface displays the finding.

23 Claims, 9 Drawing Sheets

FIG. 7

Static Assessment

POST /assessment/static

This endpoint receives output from a build process (e.g. Jenkins automation server). Required inputs include a dependency-resolved code archive and the name of the registered component to assess. A successful POST will initiate both static and composition code scans by default.

Please allow sufficient time for the scan to start - for large code archives, the request may take over 5 minutes to complete.

Parameters componentNa... (required)
    string  Component name as registered in the application codeArchive  [Browse...] No file selected.
    file
    Zipped archive of code with resolved dependencies - file should be in .zip format staticOnly ▼
    boolean
    To run only a static scan, optionally set this parameter to [true]. Note: If specified, either [staticOnly] OR [compositionOnly] must be true.

compositionO... ▼
    boolean
    To run only a composition scan, optionally set this parameter to [true]. Note: If specified, either [staticOnly] OR [compositionOnly] must be true.

Test this endpoint
[TRY]

RESPONSE SAMPLE

```
{
  "code": 200,
  "message": "success"
}
```

RESPONSE SCHEMA

[ ] Success

| code *integer* | HTTP response code (e.g. 200 OK, 403 Forbidden, 503 Service Unavailable). The overall request will return a 200 response, but this code should be used to determine the request status. |
| message *string* | Human-readable response text, corresponding to the provided "code". For error responses, use this field to troubleshoot and resubmit. |
| fields *(optional) string* | Present for unsuccessful responses. Indicates which fields were invalid and may contain multiple errors. The position of the field and the "message" response parameter correspond to one another. |

API REFERENCE
- Application
- Beta
- Component
- Deprecated
- Devops

Static Assessment
- Enroll
- Reports

API
Bake security into your build process.

*Return to Home*

Contact:
Email address

BASE URL: /api  API VERSION: 1.0

METHODS AND SYSTEMS FOR REDUCING FALSE POSITIVE FINDINGS

CROSS-REFERENCE OF RELATED APPLICATIONS

This disclosure incorporates by reference U.S. patent application Ser. No. 16/177,178, filed Oct. 31, 2018, entitled "Methods and Systems for multi-tool orchestration", U.S. patent application Ser. No. 16/177,275, filed Oct. 31, 2018, entitled "Methods and Systems for Determining Software Risk Scores," U.S. patent application Ser. No. 16/177,299, filed Oct. 31, 2018, entitled "Methods and Systems for De-duplication of Findings," the contents of which are incorporated by reference herein as if they were restated in full.

FIELD

The presently disclosed subject matter relates generally to validating findings produced by multiple software security analysis tools, more particularly, to systems and methods that reduce false positive findings generated by multiple software security analysis tools.

BACKGROUND

Traditionally, most software security analysis tools generate erroneous, invalid or non-real findings, or findings that have low value, which may be collectively referred to as false positive findings. Some types of analysis tools, such as Static Application Security Testing (SAST) tools, often generate false positive data far greater than true positive data. To reduce noise created by the false positive data, application owners are forced to manually assess each finding through a tedious and time-consuming process. Otherwise, application owners may process the entire set of findings by accepting the risk of having false positive data. The existing technology does not provide any efficient and automated mechanism that produces true positive results, or produces results that have a high likelihood of accuracy.

In view of the foregoing, a need exists for an efficient solution that automatically validates findings generated by software security analysis tools, and eliminates false positive findings with a high degree of accuracy. Embodiments of the present disclosure are directed to this and other considerations.

SUMMARY

Aspects of the disclosed technology include systems and methods for validating findings generated by software security analysis tools. Scan results produced by the software security analysis tools may contain false positive findings. To detect such findings in an example implementation, the disclosed system computes a validity score for each finding based on a source truth dataset that contains criteria for validating characteristics of findings. The disclosed system may implement a machine learning algorithm that continuously develops the source truth dataset as scan volume increases. Sometimes the validity score may be calculated by taking into consideration of confidence levels of each software security analysis tool. Duplicate findings detected by multiple software security analysis tools may have an increased validity score. If the validity score fails to meet a validity threshold, the finding may be deemed false positive. The disclosed system may modify scanning rules based on characteristics of false positive findings to reduce future generation of false positive findings.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings:

FIG. 7 is an example screenshot of a graphical user interface of the validation system according to one aspect of the disclosed technology.

FIG. 8 is another example screenshot of the graphical user interface of the validation system according to one aspect of the disclosed technology.

DETAILED DESCRIPTION

Figure 1:
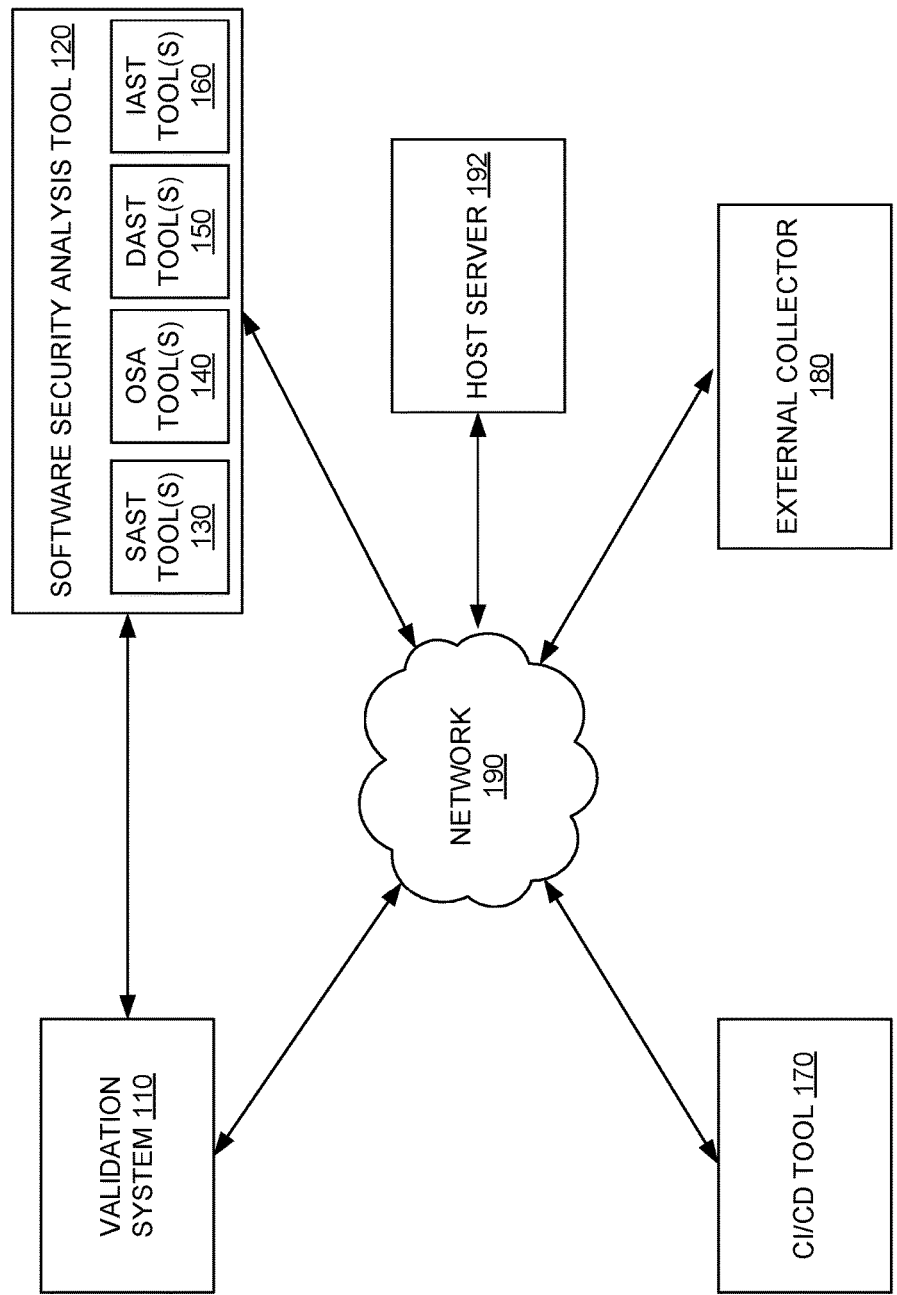
FIG. 1 is a diagram of an example environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

Consistent with the disclosed embodiments, a system for assessing software risks includes a non-transitory computer readable medium and a processor. The non-transitory computer readable medium may store a plurality of confidence scores designating confidence levels of a plurality of software security analysis tools of different categories. The non-transitory computer readable medium may store findings generated by each software security analysis tool. The non-transitory computer readable medium may store a source truth dataset including criteria for validating characteristics of software security analysis findings. The processor may be configured to receive a first finding from a first software security analysis tool that performs a scan on a software project, such as application code, for example. The processor may identify a first characteristic from the first finding. The processor may select a criterion for validating the first characteristic from the non-transitory computer readable medium. The processor may determine a first validity factor by determining whether the selected criterion is met. The processor may determine a second validity factor by retrieving, from the non-transitory computer readable medium, a confidence score. The confidence score may be associated with the first software security analysis tool. The processor may determine a third validity factor by determining a number of findings stored in the non-transitory computer readable medium that overlap with the first finding. The processor may determine a validity score for the first finding based on at least one of a first validity factor, a second validity factor and a third validity factor. The processor may determine whether the first finding is false positive by comparing the validity score to a predetermined validity threshold. The processor may display the first finding on a graphical user interface when the first finding is true positive.

In one embodiment, the processor may be configured to update the source truth dataset stored in the non-transitory computer readable medium based on whether the first finding is false positive.

In one embodiment, the processor may be configured to exclude the first finding from being displayed on the graphical user interface when the first finding is false positive.

In one embodiment, the processor may be configured to receive, via the graphical user interface, a disposition of the first finding entered by a user. The processor may update the source truth dataset stored in the non-transitory computer readable medium based on the disposition.

In one embodiment, the processor may be configured to exclude the first finding from being displayed on the graphical user interface when the disposition indicates that the first finding is false positive.

In one embodiment, the source truth dataset may include information of disposition of findings entered by the user.

In one embodiment, the processor may be configured to update a scan rule of the first software security analysis tool to omit scanning the first characteristic when a plurality of findings having the first characteristic are false positive.

In an example embodiment, each software security analysis tool may belong to one of the following categories, including: a first category of at least one software security analysis tool for performing SAST, a second category of at least one software security analysis tool for performing Dynamic Application Security Testing (DAST), a third category of at least one software security analysis tool for performing Open Source Analysis (OSA), and a fourth category of at least one software security analysis tool for performing Interactive Application Security Testing (IAST). Other software security analysis tools or tool categories may also be implemented.

In one embodiment, a confidence score associated with a software security analysis tool of the first category may be lower than a confidence score associated with a software security analysis tool of the third category.

In one embodiment, a confidence score associated with a software security analysis tool of the second category is lower than a confidence score associated with a software security analysis tool of the third category.

In one embodiment, each category may be associated with a predetermined validity threshold.

In one embodiment, the predetermined validity thresholds associated with different categories may be different.

In one embodiment, the selected criterion may include a requirement of presence of a second finding with a second characteristic with respect to the application code.

In one embodiment, the processor may determine the first validity factor by determining whether the second finding with the second characteristic is present in any finding generated by any software security analysis tool that performs a scan on the application code.

In one embodiment, the processor may determine the first validity factor by determining whether the second finding with the second characteristic is present in any finding generated by the first software security analysis tool that performs the scan on the application code.

In one embodiment, the non-transitory computer readable medium may store characteristic confidence scores indicating confidence levels of each software security analysis tool to correctly identify each characteristic of findings.

In one embodiment, the processor may determine the validity score for the first finding based on a characteristic confidence score that indicates a confidence level of the first software security analysis tool to correctly identify the first characteristic.

In one embodiment, the third validity factor may indicate an increase of likelihood of validity when there exists a plurality of findings produced by other software security analysis tools that overlap with the first finding.

Another aspect of the disclosed technology relates to a system for validating software security analysis findings. The system includes a non-transitory computer readable medium and a processor. The non-transitory computer readable medium may store a source truth dataset including criteria for validating characteristics of software security analysis findings. The processor may be configured to receive a first finding from a first software security analysis tool that performs scan on application code. The processor may identify a characteristic from the first finding. The processor may select a criterion for validating the identified characteristic from the non-transitory computer readable medium. The processor may determine a validity score for the first finding based on whether the selected criterion is met. The processor may determine whether the first finding is false positive by comparing the validity score to a predetermined validity threshold. The processor may display the first finding on a graphical user interface when the first finding is true positive.

In one embodiment, the processor may be configured to determine a number of findings stored in the non-transitory computer readable medium that overlap with the first finding. The processor may determine whether the first finding is false positive based on the number of findings stored in the non-transitory computer readable medium that overlap with the first finding.

In one embodiment, the processor may be configured to determine a confidence score associated with the first software security analysis tool. The processor may determine whether the first finding is false positive based on the confidence score associated with the first software security analysis tool.

A further aspect of the disclosed technology relates to a system for validating software security analysis findings. The system includes a non-transitory computer readable medium and a processor. The non-transitory computer readable medium may store a plurality of confidence scores designating confidence levels of a plurality of software security analysis tools of different categories. The non-transitory computer readable medium may store a source truth dataset including criteria for validating characteristics of software security analysis findings. The processor may be configured to receive a first finding from a first software security analysis tool that performs a scan on a software project. The processor may identify a characteristic from the first finding. The processor may select a criterion for validating the identified characteristic from the non-transitory computer readable medium. The processor may determine a first validity factor by determining whether the selected criterion is met. The processor may determine a second validity factor by retrieving, from the non-transitory computer readable medium, the confidence score associated with the first software security analysis tool. The processor may determine a validity score for the first finding based on at least one of the first validity factor and the second validity factor. The processor may determine whether the first finding is false positive by comparing the validity score to a predetermined validity threshold. The processor may display the first finding on a graphical user interface when the first finding is true positive.

In one embodiment, the processor may be configured to determine a number of findings stored in the non-transitory computer readable medium that overlap with the first finding. The processor may determine whether the first finding is false positive based on the number of findings stored in the non-transitory computer readable medium that overlap with the first finding.

Consistent with the disclosed embodiments, methods for validating software security analysis findings are disclosed.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations, the environment 100 may include one or more of the following: one or more validation systems 110, one or more software security analysis tools 120, one or more continuous integration, continuous delivery (CI/CD) tools 170, one or more external collectors 180, one or more networks 190, and one or more host servers 192.

The validation system 110 may validate findings generated by the software security analysis tools 120.

The software security analysis tools 120 may include one or more categories, such as a first category of one or more SAST tools 130, a second category of one or more OSA tools 140, a third category of one or more DAST tools 150, and a fourth category of one or more IAST tools 160, among other possibilities.

Each software security analysis tool 120 of the first, second, third and fourth categories may be a standalone solution, a network-based client-server solution, a web-based solution, or a cloud-based solution, among other possibilities. Each software security analysis tool 120 may be provided by a different licensor or vendor, and thus each may be independent of each other. The SAST tools 130 may include Checkmarx™ and Fortify™, among other possibilities. The OSA tools 140 may include Whitesource™ and Blackduck™, among other possibilities. The DAST tools 150 may include WebInspect™ and Contrast™, among other possibilities. The IAST tools 160 may include Veracode™ and WhiteHat™, among other possibilities.

The findings returned by each tool 120 may reveal software issues in software projects (e.g. application code) detected by each tool 120.

Figure 2:
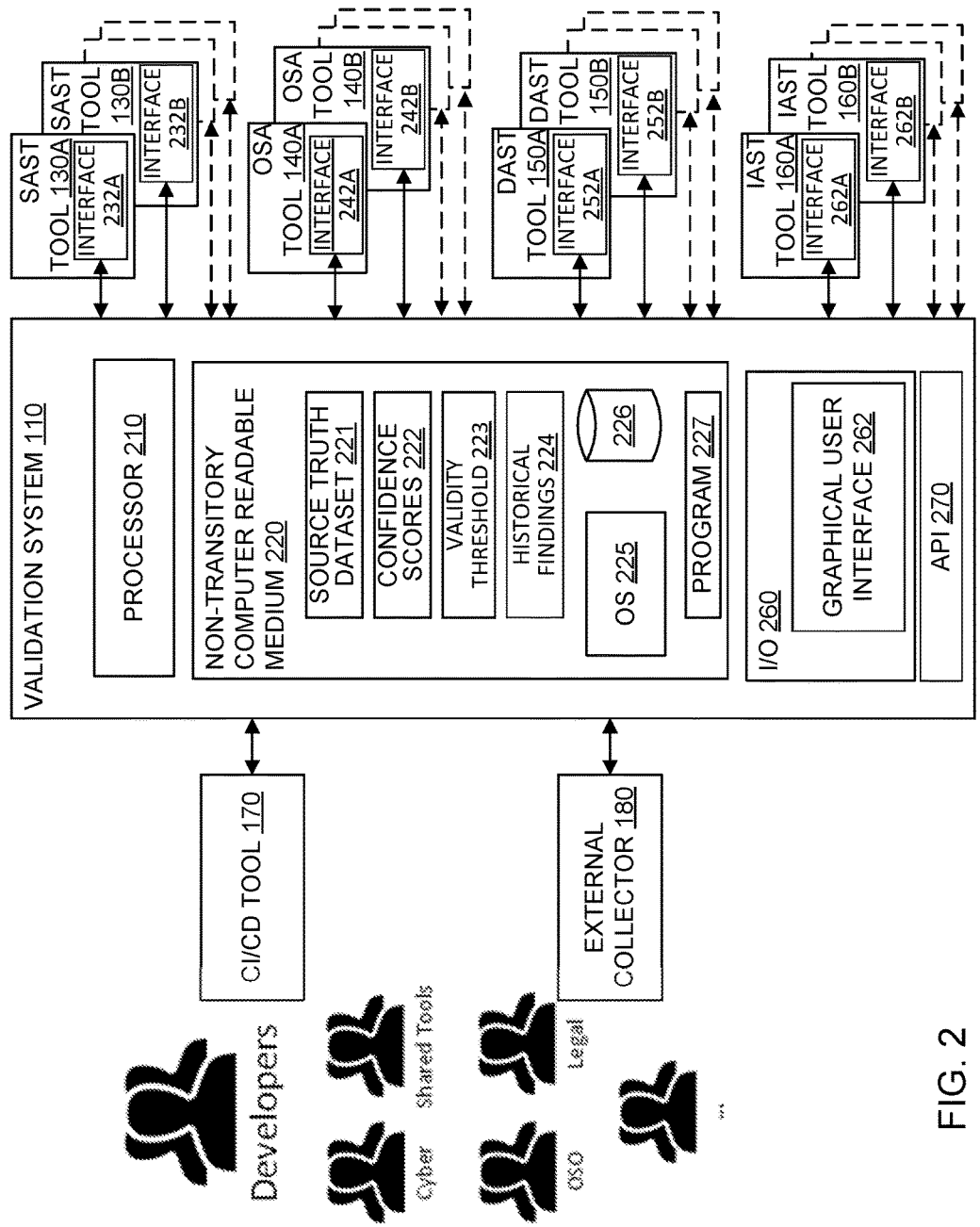
FIG. 2 is an example block diagram illustrating communications between a validation system and multiple software security analysis tools according to one aspect of the disclosed technology.

Turning to FIG. 2, the validation system 110 may validate findings generated by one or more SAST tools 130A-130C, one or more OSA tools 140A-140C, one or more DAST tools 150A-150C, and one or more IAST tools 160A-160C, among other possibilities.

The validation system 110 may include one or more of the following: a processor 210, a non-transitory computer readable medium 220, an input/output ("I/O") device 260, and an application program interface (API) 270, among other possibilities. The I/O device 260 may include a graphical user interface 262.

Sometimes scan results returned by the software security analysis tools 120 may contain false positive findings. The validation system 110 may perform validation and eliminate such findings. For example, the validation system 110 may compute a validity score for each finding produced by each tool 120. The validity score may indicate accuracy of the finding. The validity score may indicate how likely true or how valuable a finding is.

If the validity score fails to meet a predetermined validity threshold, the finding may be deemed false positive. For instance, on a scale from 0 to 100, if a validity score is 75, which is lower than a validity threshold of 80, then the finding may be deemed false positive. When the validity score meets the validity threshold, the finding may be deemed correct, valid, real or valuable, which may collectively be referred as true positive.

In one example, the validation system 110 may display the validity score for each finding on the graphical user interface 262, and let the user decide whether the finding is true positive or false positive. By doing so, the validation system 110 may provide a more accurate and complete result than what an individual tool 120 may produce. The user may assess a finding as false positive via the graphical user interface 262.

In another example, the graphical user interface 262 of the validation system 110 may only show findings that are deemed true positive.

In one example, the processor 210 may identify a finding produced by one tool 120 as false positive. The processor 210 may subsequently instruct one or more other software security analysis tools 120 to perform one or more additional scans to see if the same finding is yielded. As more tools 120 generate the same finding, it becomes more likely that the finding is true positive, not false positive.

The non-transitory computer readable medium 220 may store a source truth dataset 221 or known dataset. The source truth dataset 221 may identify criteria for validating characteristics of findings.

The source truth dataset 221 may initially include manually-dispositioned data that indicates criteria for validating findings. Such manually-dispositioned data may include information of disposition of findings entered by the user. Manually-dispositioned data may include information that indicates findings with particular characteristics that tend to be false positive. The validation system 110 may implement a machine learning algorithm that gradually grows the source truth dataset 221 as more scans are performed. For instance, as more findings with a new particular characteristic turn out to be false positive, the validation system 110 may add a criterion for validating the new characteristic into the source truth dataset 221.

The non-transitory computer readable medium 220 may store a plurality of confidence scores 222 designating confidence levels of the software security analysis tools 120. The confidence score 222 may indicate a quality of findings based on what tools 120 generate the findings. Static vulnerability findings produced by SAST tools 130 and dynamic vulnerability findings produced by DAST tools 150 are prone to be false positive. On the other hand, findings produced by OSA tools 140, such as open source license findings or open source vulnerability findings, tend to be more certain, and are less likely to be false positive. Accordingly, a confidence score of an OSA tool 140 may be higher than a confidence score of an SAST tool 130. Similarly, the confidence score of the OSA tool 140 may be higher than a confidence score of a DAST tool 150.

The non-transitory computer readable medium 220 may store a plurality of predetermined validity thresholds 223 for different category of tools 120. For instance, the medium 220 may store a first predetermined validity threshold for SAST tools 130, a second predetermined validity threshold for OSA tools 140, a third predetermined validity threshold for DAST tools 150, and a fourth predetermined validity threshold for IAST tools 160. The validity thresholds for different categories may be different. For instance, the validity threshold for OSA tools 140 may be lower than the validity threshold for SAST tools 130. Each validity threshold 223 is configurable and changeable over time. Each finding may be excluded or promoted by comparing its validity score to the validity threshold.

The non-transitory computer readable medium may store characteristic confidence scores indicating confidence levels of each software security analysis tool 120 to correctly identify each finding characteristic. The characteristic confidence score may indicate individual confidence of a particular tool 120 to correctly identify a finding characteristic. For instance, not all tools 120 are equally effective at correctly identifying cross-site scripting. A first tool 120 may be more effective at correctly identifying cross-site scripting, while a second tool 120 may not be able to detect cross-site scripting or may tend to generate a false finding of cross-site scripting. Accordingly, the characteristic confidence score of the first tool for identifying cross-site scripting may be higher than that of the second tool. In the example implementations, the effectiveness of any one tool with respect to any particular vulnerability of characteristic may be adjusted over time based on user inputs or assessments of historical findings.

The non-transitory computer readable medium 220 may store historical findings 224 generated by each software security analysis tool 120.

Figure 3:
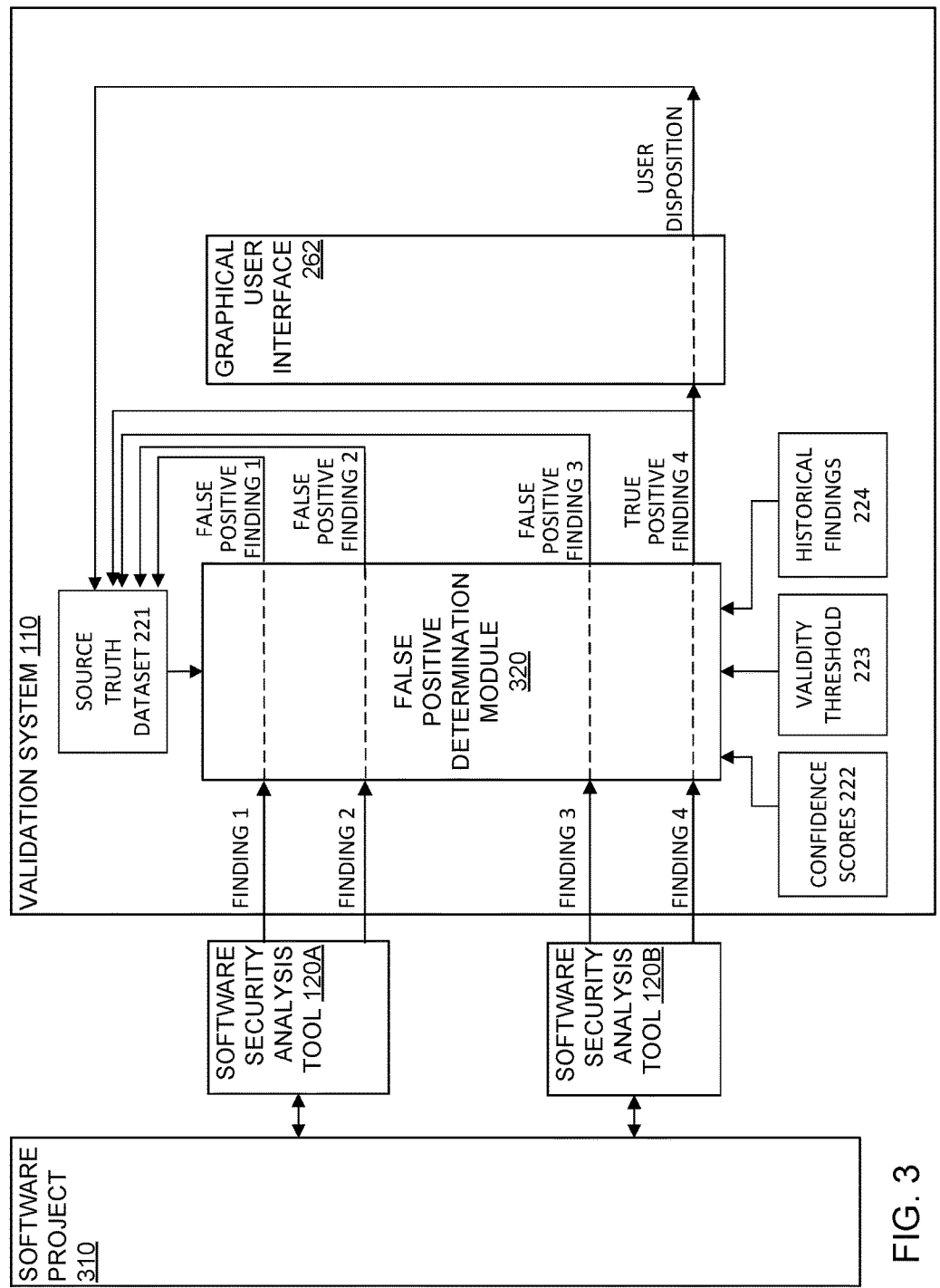
FIG. 3 is an example block diagram illustrating a process for validating findings performed by the validation system according to one aspect of the disclosed technology.

FIG. 3 illustrates a block diagram illustrating a validation process performed by the validation system 110. The validation system 110 may instruct multiple software security analysis tools 120A and 120B to scan a software project 310.

The first software security analysis tool 120A and the second software security analysis tool 120B may belong to at least one of the following categories: a first category for performing SAST, a second category for performing OSA, a third category for performing DAST, and a fourth category for performing IAST. Each tool 120A and 120B may belong to a different category. For instance, the first tool 120A may be a SAST tool, while the second tool 120B may be an OSA tool. The tools 120A and 120B may run during the same scan session or at different scan sessions.

In one embodiment, the tools 120A and 120B may be from different vendors. Each tool 120A, 120B may generate a finding at a vendor-provided format. For instance, the first tool 120A may generate findings in a first vendor-provided format, and the second tool 120B may generate findings in a second vendor-provided format. The first and second vendor-provided formats may be identical to or different from each other. In one example, findings generated by the first tool 120A may be in the format of XML, while findings generated by the second tool 120B may be in the format of JSON.

The software project 310 (which may include a plurality of application code) may include several software issues that are detectable by one or more software security analysis tools. For instance, some software issues may be detectable by the first tool 120A, while other software issues may be detectable by the second tool 120B. Each tool may generate a finding corresponding to each detectable software issue. The tools 120A and 120B may report their findings to the validation system 110. For instance, the tool 120A may report FINDING 1 and FINDING 2 to the validation system 110, while the tool 120B may report FINDING 3 and FINDING 4 to the validation system 110.

The tools 120A and 120B may report their findings at different timestamps or different scan sessions. For instance, the first tool 120A may report at a first timestamp, and the second tool 120B may report at a second timestamp. The second timestamp may occur after the first timestamp.

The validation system 110 may validate each finding by using a false positive determination module 320. The false positive determination module 320 may be implemented by a machine-learning algorithm executable by the processor 210.

The module 320 may perform basic false positive reduction. For instance, the module 320 may receive findings from three tools. If a finding is found by only one tool, but not by the other two tools, the module 320 may determine that the finding is more likely to be false positive.

The module 320 may perform sophisticated false positive reduction. The module 320 may compute a validity score for each finding. The validity score may be computed based on one or more of various validity factors.

A first validity factor may depend on the source truth dataset 221. The module 320 may identify a characteristic from each finding. The module 320 may select from the source truth dataset 221 a criterion for validating the identified characteristic. The module 320 may determine the first validity factor by determining whether the selected criterion is met. For example, with respect to FINDING 1, the module 320 may identify its characteristic, and selects a criterion from the source truth dataset 221 with respect to that characteristic. The module 320 may then determine whether the criterion is met. If the criterion is met, the first validity factor may indicate that FINDING 1 is more likely true positive. On the other hand, if the criterion is not met, the first validity factor may indicate that FINDING 1 is more likely false positive.

A criterion for validating a first finding having a first characteristic may require presence of a second finding with a second characteristic. For instance, cross-site request forgery is an attack that is often difficult to validate. Cross-site request forgery typically becomes risky or at least imposes a greater risk when cross-site scripting is present. Many tools 120 that generate a finding indicating cross-site request forgery, alone, without cross-site scripting, often turn out to be false positive. In one example, the criterion for validating a finding of cross-site request forgery may require presence of a finding of cross-site scripting. If the criterion is met, the finding of cross-site request forgery may likely be true positive. If the criterion is not met, the finding of cross-site request forgery may likely be false positive. In one example, the criterion may require that the finding of cross-site scripting needs be generated by a tool 120 that tends to be good at finding it, or a tool 120 with a high characteristic confidence score in finding cross-site scripting. The tool 120 may or may not be necessarily the same as the tool 120 that finds cross-site request forgery. In one example, the criterion may require that the finding of cross-site scripting needs be generated by the same tool 120 that finds cross-site request forgery.

In one example, the criterion for validating FINDING 1 may require presence of an additional finding of a specific characteristic with respect to the software project 310. The criterion may specify that this additional finding needs to be generated by the same tool 120A that generates FINDING 1. Alternatively, the criterion may specify that this additional finding can be generated by any tool, but with a high characteristic confidence score. The module 310 may assess whether each criterion is met.

A second validity factor may be a confidence score 222 associated with the tool 120 that generates the finding. For instance, when validating FINDING 1 generated by the tool 120A, the module 320 may retrieve, from the non-transitory computer readable medium 220, a confidence score 222 associated with the tool 120A. If the confidence score 222 is high, the second validity factor may indicate FINDING 1 is more likely true positive. On the other hand, if the confidence score 222 is low, the second validity factor may indicate FINDING 1 is more likely false positive. Similarly, when validating FINDING 3 or FINDING 4 generated by the tool 120B, the module 320 may retrieve a confidence score associated with the tool 120B.

A third validity factor may be based on how many tools 120 have identified the same finding when performing a scan on the software project 310. For instance, the module 320 may determine how many findings stored in the non-transitory computer readable medium 220 overlap with or duplicate the same finding. The third validity factor may indicate an increase of likelihood of validity when there exist more findings produced by other software security analysis tools that overlap with the first finding. For instance, with respect to FINDING 1, the module 320 may look up historical findings 224 stored in the medium 220 to determine if FINDING 1 or any finding identical to FINDING 1 has been previously detected by any tool 120 that performs scan on the software project 310. The module 320 may determine how many tools 120 have previously identified FINDING 1 or any finding identical to FINDING 1. If three tools perform scan on the software project 310, only one tool identifies FINDING 1, then the third validity factor may indicate that FINDING 1 is more likely false positive. On the other hand, if all three tools identify FINDING 1, then the third validity factor may indicate that FINDING 1 is more likely true positive.

The module 320 may determine a validity score for each finding. The validity score may indicate how likely the finding is false positive. If the finding tends to be true positive, its validity score may be high, such as 90%. If the finding tends to be false positive, its validity score might be low, such as 10%. The module 320 may calculate the validity score for each finding based on at least one of a first validity factor, a second validity factor and a third validity factor. For instance, to compute a validity score for FINDING 1, the module 320 may rely on one or more of the following information: (1) a first validity factor based on whether a criterion associated with the finding characteristic is met, (2) a second validity factor indicating a confidence score associated with the tool 120A, and (3) a third validity factor indicating how many tools have identified FINDING 1 in the software project 310 or how many findings stored in the non-transitory computer readable medium 220 overlap with or duplicate FINDING 1.

In one embodiment, the module 320 may produce the validity score based on one validity factor alone. For instance, the validity score may be calculated based on the first validity factor alone.

In another embodiment, the validity score may depend on any two of the three validity factors. For instance, the validity score may be calculated based on the first validity factor and the second validity factor. In another instance, the validity score may be calculated based on the first validity factor and the third validity factor.

In a further embodiment, the validity score may depend on all three validity factors, or any additional factor.

The module 320 may determine whether each finding is false positive by comparing its validity score to a predetermined validity threshold 223. For example, the module 320 may determine whether FINDING 1 is false positive if its validity score is lower than the validity threshold 223 of the tool 120A. Similarly, FINDING 2 may be false positive if its validity score is lower than the validity score of the tool 120A. On the other hand, if a validity score exceeds a validity threshold, then the finding may be deemed true positive. For instance, FINDING 4 may be true positive if its validity score exceeds the validity score of the tool 120B.

The module 320 may display findings that are true positive on the graphical user interface 262. The module 320 may suppress output of false positive findings or exclude false positive findings from being displayed on the graphical user interface 262.

As the module 320 continuously processes scan results or findings generated by tools 120, the module 320 may further update the source truth dataset 221. For instance, as shown in FIG. 3, FINDINGS 1, 2 and 3 are deemed false positive by the module 320, and FINDING 4 is deemed true positive. Their information may be fed back to the source truth dataset 221. FINDINGS 1, 2, and 3 may share a similar characteristic criterion that is not recorded in the source truth dataset 221. By adding such information to the source truth dataset 221, the source truth dataset 221 may be used to detect future false positive findings with such characteristics or detect future false positive findings that fail to meet the criterion for such characteristics. As a result, a model trained on the source truth dataset 221 over time becomes increasingly accurate at identifying false positive findings for any category of tools 120.

Once the module 320 determines that a finding is true positive, such as FINDING 4, the graphical user interface 262 may display the finding. The user may review and dispose the finding via the graphical user interface 262. In one instance, the user may enter a disposition through the graphical user interface 262 indicating that the finding is invalid. The disposition may be fed to the source truth dataset 221 to further update the source truth dataset 221 for retraining a model. If the user's disposition indicates that a finding is false positive, then that finding may be excluded from being displayed on the graphical user interface 262.

In one embodiment, false positive findings may be displayed on the graphical user interface 262. Validity scores may also be shown on the graphical user interface 262. The user may determine how to dispose or assess each false positive finding. For instance, the user may confirm that the finding is indeed false positive or may change the finding to true positive. User's disposition may be fed to the source truth dataset 221 to further train the source truth dataset 221.

As patterns of false positive findings emerge, types of checks may be omitted based on known characteristics of an application. The validation system 110 may modify scanning rules based on characteristics of such findings to reduce future generation of false positive findings. The validation system 110 may be configured to update a scan rule of each tool 120 to omit scanning a certain characteristic when multiple findings having the same characteristic are deemed false positive.

Figure 4:
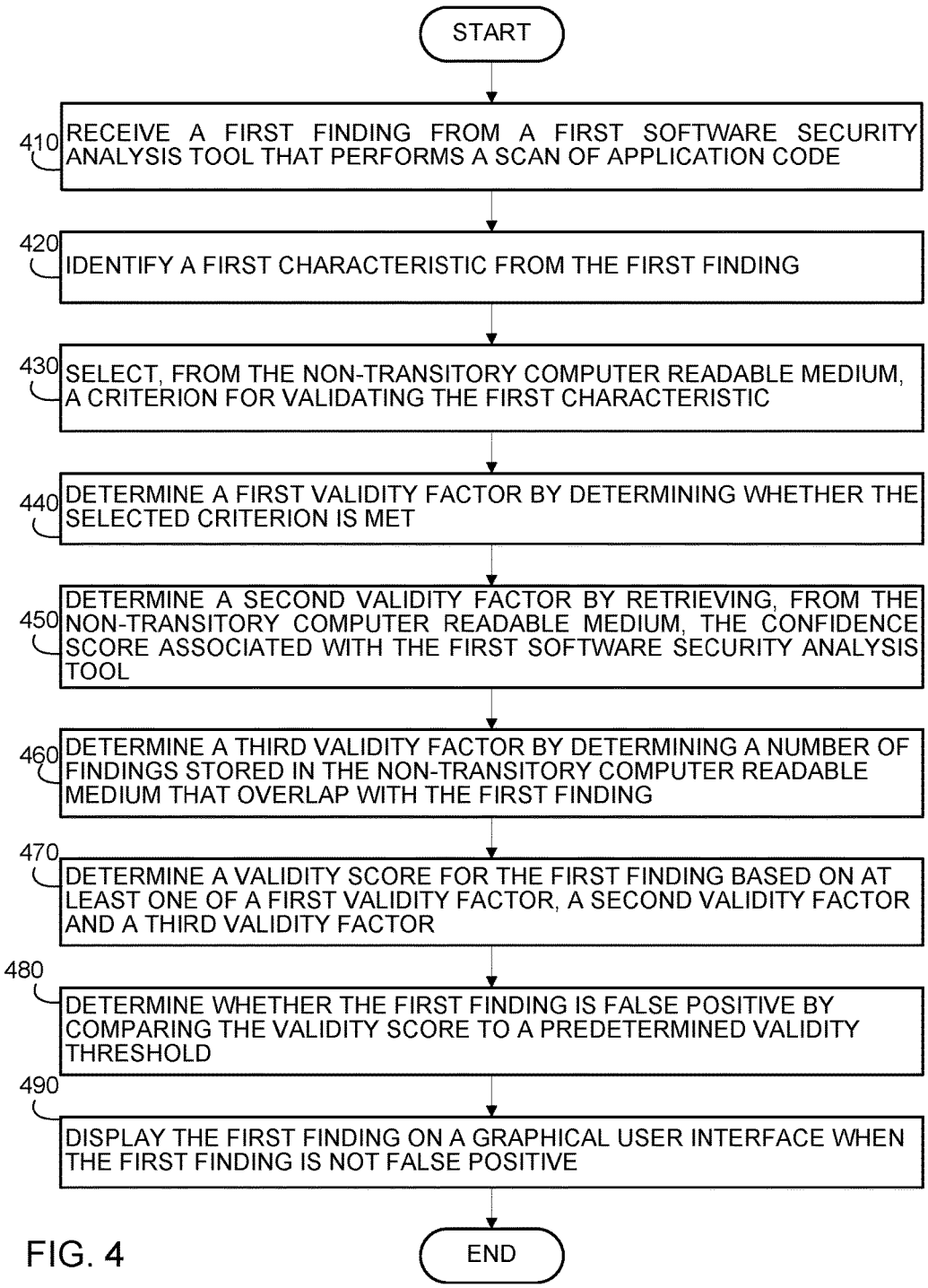
FIG. 4 is a first example flow chart of a validation process performed by the validation system according to one aspect of the disclosed technology.

FIG. 4 is an example flow chart of a validation process performed by the validation system 110. At 410, the processor 210 may receive a first finding, such as FINDING 1, from a first software security analysis tool 120A that performs scan on a software project 310. At 420, the processor 210 may identify a first characteristic from the first finding. At 430, the processor 210 may select, from the non-transitory computer readable medium 220, a criterion for validating the first characteristic. At 440, the processor 210 may determine a first validity factor by determining whether the selected criterion is met. At 450, the processor 210 may determine a second validity factor by retrieving, from the non-transitory computer readable medium 220, the confidence score 222 associated with the first software security analysis tool 120A. At 460, the processor 210 may determine a third validity factor by determining a number of findings stored in the non-transitory computer readable medium 220 that overlap with the first finding. At 470, the processor 210 may determine a validity score for the first finding based on at least one of a first validity factor, a second validity factor and a third validity factor. At 480, the processor 210 may determine whether the first finding is false positive by comparing the validity score to a predetermined validity threshold. At 490, the processor 210 may display the first finding on the graphical user interface 262 when the first finding is true positive.

Figure 5:
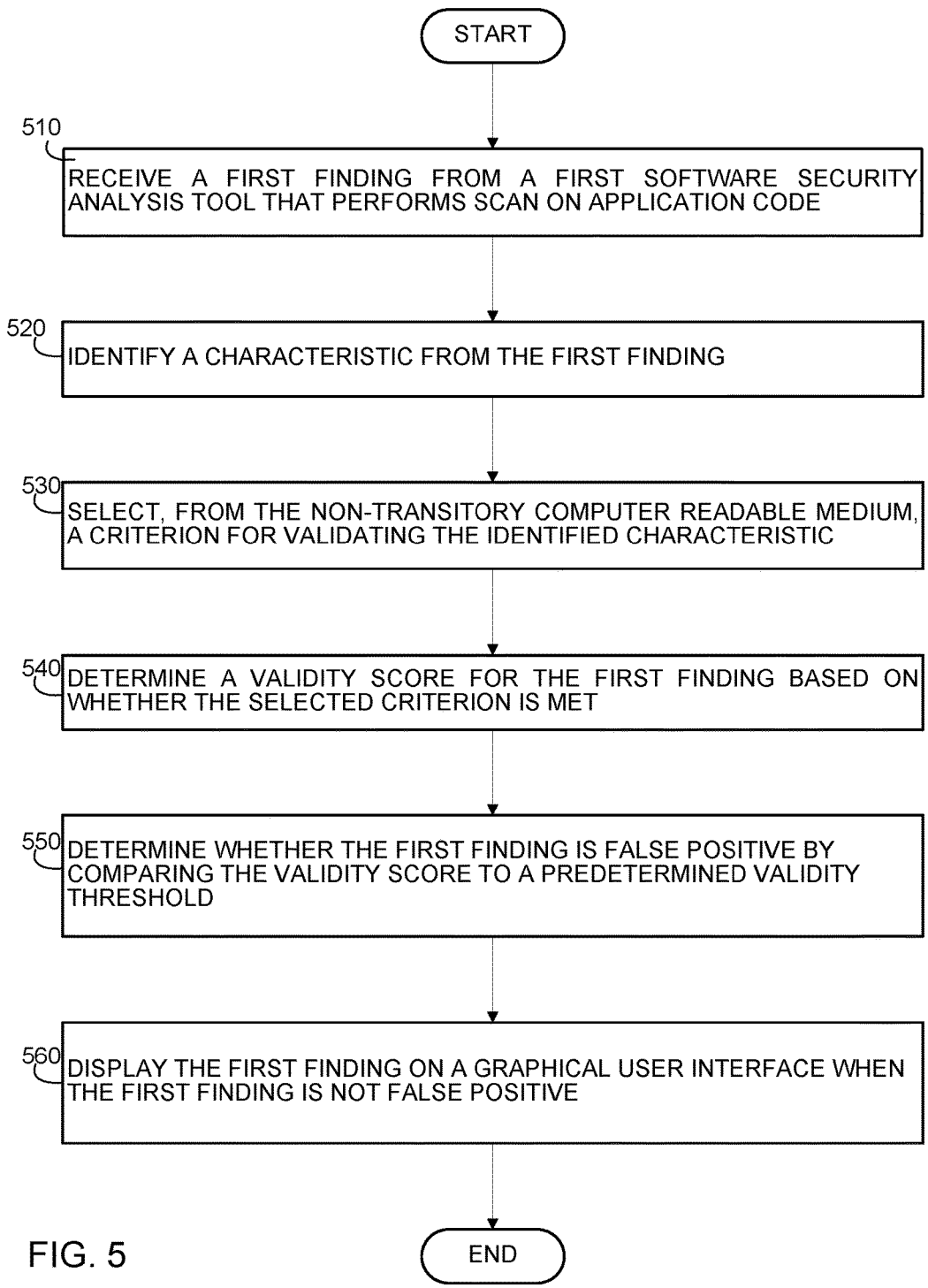
FIG. 5 is a second example flow chart of a validation process performed by the validation system according to one aspect of the disclosed technology.

FIG. 5 illustrates another example flow chart of a validation process performed by the validation system 110. At 510, the processor 210 may receive a first finding from a first software security analysis tool 120A that performs a scan of application code, such as application code of a software project 310. At 520, the processor 210 may identify a characteristic from the first finding. At 530, the processor 210 may select, from the non-transitory computer readable medium 220, a criterion for validating the identified characteristic. At 540, the processor 210 may determine a validity score for the first finding based on whether the selected criterion is met. At 550, the processor 210 may determine whether the first finding is false positive by comparing the validity score to a predetermined validity threshold. At 560, the processor 210 may display the first finding on the graphical user interface 262 when the first finding is true positive.

In one embodiment, the processor 210 may determine the number findings stored in the non-transitory computer readable medium 220 that overlap with the first finding. The processor 210 may determine whether the first finding is false positive based on the number of findings stored in the non-transitory computer readable medium 220 that overlap with the first finding.

In one embodiment, the processor 210 may select a confidence score 222 associated with the first software security analysis tool 120A from the non-transitory computer readable medium 220. The processor 210 may determine whether the first finding is false positive based on the confidence score associated with the first software security analysis tool 120A.

Figure 6:
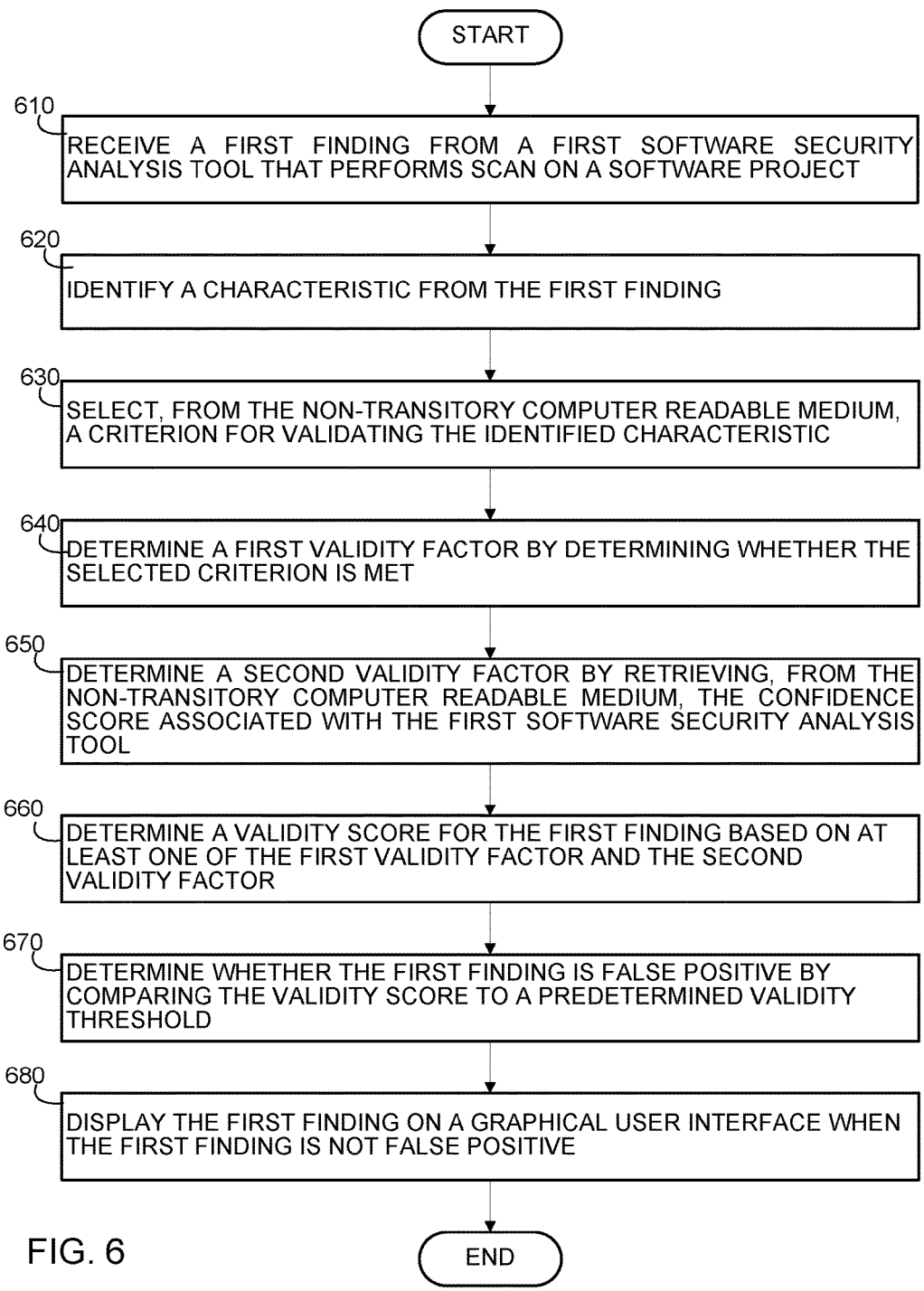
FIG. 6 is a third example flow chart of a validation process performed by the validation system according to one aspect of the disclosed technology.

FIG. 6 illustrates another example flow chart of a validation process performed by the validation system 110. At 610, the processor 210 may receive a first finding from a first software security analysis tool 120A that performs a scan on application code, such as application code of a software project 310. At 620, the processor 210 may identify a characteristic from the first finding. At 630, the processor 210 may select, from the non-transitory computer readable medium 220, a criterion for validating the identified characteristic. At 640, the processor 210 may determine a first validity factor by determining whether the selected criterion is met. At 650, the processor 210 may determine a second validity factor by retrieving, from the non-transitory computer readable medium 220, the confidence score associated with the first software security analysis tool 120A. At 660, the processor 210 may determine a validity score for the first finding based on at least one of the first validity factor and the second validity factor. At 670, the processor 210 may determine whether the first finding is false positive by comparing the validity score to a predetermined validity threshold. At 680, the processor 210 may display the first finding on a graphical user interface 262 when the first finding is true positive.

In one embodiment, the processor 210 may determine a number of findings stored in the non-transitory computer readable medium 220 that overlap with the first finding. The processor 210 may determine whether the first finding is false positive based on the number of findings stored in the non-transitory computer readable medium 220 that overlap with the first finding.

As shown in FIG. 2, various users or interest groups, such as application owners, developers, lines of business, and executive stakeholders may use the validation system 110.

In one example, the validation system 110 may orchestrate the software security analysis tools 120. The validation system 110 may interface with and collect information from various software security analysis tools 120 behind scenes. Acting as an abstraction layer on top of underlying interfaces for software security analysis tools 120, the validation system 110 may orchestrate the software security analysis tools 120 by selectively activating their scan functions to scan software projects, monitoring or tracking their scan activities throughout scan processes, and reviewing findings once scans are completed. The validation system 110 may serve as a single interface or a single end-point between the user and software security analysis tools 120. By serving as a single interface to access scan results of software security analysis tool 120, the validation system 110 may reduce complexity of integration and provide consistency when the user reviews scan results.

The validation system 110 may trigger multiple software security analysis tools 120 of the same category to start scan simultaneously or at predetermined timestamps. For example, the validation system 110 may instruct multiple SAST tools 130A-C to perform scan simultaneously or at predetermined timestamps. SAST tool 130A may be Checkmarx™, and SAST tool 130B may be Fortify™.

Also, the validation system 110 may trigger one or more software security analysis tools 120 of different categories to start scan simultaneously or at predetermined timestamps. For example, the validation system 110 may instruct multiple SAST tools 130A-B, and multiple OSA tools 140A-B to perform scan simultaneously or at predetermined timestamps. SAST tool 130A may be Checkmarx™, and SAST tool 130B may be Fortify™. OSA tool 140A may be Whitesource™, and OSA tool 150B may be Blackduck™.

The validation system 110 may trigger the same software security analysis tool 120, such as SAST tool 130A, to perform scan over scan at different timestamps or different scan sessions. SAST tool 130A may be Checkmarx™.

In one scenario, SAST tool 130A reports a finding that identifies a software issue that may need to be resolved to the validation system 110. To validate whether the issue has been resolved, the validation system 110 may not need to request the same SAST tool 130A to perform a scan for a second time. Instead, the validation system 110 may wait for remaining tools to complete their scans. Based on findings reported by the remaining tools, the validation system 110 may determine that the software issue has been resolved, the validation system 110 may update the aggregate scan result.

In one example, as shown in FIG. 2, the validation system 110 may be plugged into one or more CI/CD tools 170 such that whenever code is checked in or a change is made to a particular software product, the validation system 110 may automatically initiate one or more SAST tools 130A-C, one or more OSA tools 140A-C, one or more DAST tools 150A-C, or one or more IAST tools 160A-C to perform scan. Examples of the CI/CD tools 170 may include Jenkins™ and CircleCI™, among other possibilities.

In one example, the user may operate the validation system 110 through one or more external collectors 180. The external collectors 180 may communicate with the API 270 of the validation system 110. An example of the external collectors 180 may include Hygieia™, an open source DevOps dashboard for visualizing a development pipeline.

In one example, the validation system 110 may rely on the graphical user interface 262 to interact with a user, such as receiving user inquiries, and providing information related to the software security analysis tools 120 and findings to the user.

In one example, when the validation system 110 receives a scan request, for example, through the API 270, the validation system 110 may automatically trigger one or more software security analysis tools 120 of the same or different categories to start scan. The request may include a minimum level of information needed to selectively activate scan functions on the software security analysis tools 120. In some embodiments, the minimum level of information may be determined based on the selection of security analysis tools 120 accessible to the validation system 110, as well as other product or enterprise considerations. The minimum level of information required of a scan request may thus be abstracted from various requirements and parameters of the various security analysis tools, so as to provide an efficient interface for user interaction.

In one example, the scan request received by the validation system 110 may include identification of code of a software project. The identification of code may include a directory indicating where the code is stored. Alternatively, the identification of code may include a zip code file. The scan request may identify the language in which the code is written, such as the primary language that the code is written in. The request may also include an identifier for which component within the system it belongs to. After receiving the scan request, the validation system 110 may send instructions to interfaces, such as APIs or command line utilities, of the various software security analysis tools 120. The various software security analysis tools 120 may be selectively determined based on the request and/or the code. Some software security analysis tools 120 may require extra information beyond the scope of the scan request to start execution, such as a line count and secondary language of the code. Although such extra information is not present (or requested of a user) in the scan request received by the validation system 110, the validation system 110 may independently determine and provide such extra information to the software security analysis tools 120, without user intervention.

Traditionally, when an organization wants to transition from one security tool to another, or swaps out one or more security tools, the organization may need to retool. Such efforts are saved by the validation system 110. With the validation system 110, backend tools may be added to or removed from the validation system 110 in a process transparent to the user or internal customer of the organization.

Each tool 120 may have a different interface or protocol. For example, SAST tools 130A-C, OSA tools 140A-C, DAST tools 150A-C, and IAST tools 160A-C may have interfaces 232A-C, 242A-C, 252A-C and 262A-C, respectively. These tools may have different types of interfaces, including RESTful API, SOAP API, and a command line utility among other possibilities. Traditionally, the user needs to learn protocols of each tool. For instance, in a situation where a first tool has a RESTful API, a second tool has a SOAP API, and a third tool does not have an API but has a command line utility, the user needs to learn how to construct appropriate requests or parameters to execute each tool. With the validation system 110 of the example embodiments, the user is no longer involved with constructing requests or parameters required by the individual protocols of each tool. By dealing with the validation system 110 alone, the user does not need to learn protocols of each software security analysis tool 120 and does not need to deal with separate interfaces such as APIs or command lines.

The validation system 110 may initiate scan activities on multiple software security analysis tools 120, and monitor scan activities performed by each tool from start to completion. As each software security analysis tool 120 completes its scan activity, the validation system 110 may receive its findings, store the received findings in the non-transitory computer readable medium 220, and wait for remaining software security analysis tools 120 to complete scans. The non-transitory computer readable medium 220 may store historical information associated with scan activity performed by each software security analysis tool 120, including but not limited to historical developments of findings.

Each software security analysis tool 120 may have a vendor-established taxonomy. Findings reported by each software security analysis tool 120 may be in a vendor-provided format. The vendor-provided format may be XML, JSON, or other structured format.

In some example embodiments, the validation system 110 may not rely on or expressly adopt any given taxonomy. For example, the validation system 110 may not rely on CWE or vendor-established taxonomies. Instead, an example validation system 110 may have a unique internal standardized taxonomy that reconciles findings generated by different software security analysis tools 120. The standardized taxonomy may be managed or defined by a dynamic classification system of names and categories. The classification system may be dynamically maintained such that any new name or category revealed by any new finding may be dynamically added to the classification system.

As a result, regardless of their vendor-provided formats, the validation system 110 may normalize each finding to a standardized taxonomy, for instance, by performing mappings to corresponding names and categories in the classification system. For instance, the validation system 110 may normalize findings generated by the first tool 120A in the format of XML to the standardized taxonomy. The validation system 110 may normalize findings generated by the second tool 120B in the format of JSON to the standardized taxonomy.

The validation system 110 may determine a fingerprint that represents each normalized finding. Each fingerprint may be determined based on at least one of the following: CWE, framework alignment, code detail, and name, among other possibilities. The code detail may include line number and code content.

The non-transitory computer readable medium 220 may store historical findings 224 generated by each software security analysis tool 120. For instance, the non-transitory computer readable medium 220 may store normalized findings. Each normalized finding may be identifiable by the fingerprint. The non-transitory computer readable medium 220 may store information of historical updates of each normalized finding for display in the graphical user interface 262 upon request.

The validation system 110 may deduplicate findings and aggregate findings that are generated by the software security analysis tools 120. The validation system 110 may perform de-duplication of the findings provided by different tools 120. For instance, if findings returned by same or different tools 120 reveal the same software issue in the same software project, then the validation system 110 may eliminate duplicate findings. If findings returned by same or different tools 120 represent developments or updates over time on the same software issue in the same software project, the validation system 110 may track historical updates on the same software issue and make such information readily available to the user upon request.

The validation system 110 may rely on fingerprints to determine correlation or similarity among findings generated by different software security analysis tools 120.

For example, for each normalized finding, the validation system 110 may determine a fingerprint that identifies the normalized finding. The validation system 110 may collect or organize one or more of the following meta information or metadata surrounding each finding to form its fingerprint: associated CWE information, framework alignment, code details, and any identifying factor, among other possibilities. Framework alignment may include Web Application Security Consortium (WASC), and Open Web Application Security Project (OWASP) Top 10, among other possibilities. Code details may include line numbers and contents, among other possibilities. The fingerprint approach remains robust regardless whether the code position, line or content changes in subsequent scans.

The validation system 110 may use the fingerprint to determine whether a finding is unique. For this purpose, the validation system 110 may implement an algorithm that identifies partial or full matches of fingerprints. For instance, the validation system 110 may use a threshold of similarity to determine partial matches of fingerprints. The algorithm may tolerate differences in code line numbers or code contents. The algorithm may de-duplicate findings generated by different software security analysis tools 120. The algorithm may also de-duplicate findings generated by the same software security analysis tools 120, scan over scan, as attributes change.

To determine if there is any match or partial match among findings, the validation system 110 may compare the fingerprints. The validation system 110 may store distinct findings in the non-transitory computer readable medium 220. If two fingerprints at least partially match each other, their respective findings may be identical or related to each other. If two findings are identical, the validation system 110 may eliminate one finding to avoid duplication of findings. If two findings are related to each other, they may represent historical developments of the same software issue, such that one finding represents an update relative to the other finding.

For any new finding received by the validation system 110, after normalization, the validation system 110 may determine whether the same finding has already existed in the medium 220 by comparing the new fingerprint that identifies the new finding with fingerprints that identify existing findings already stored in the medium 220.

If the new fingerprint for the new finding fails to at least match any fingerprint for existing findings stored in the medium 220, the validation system may add the new finding to the medium 220. If the new fingerprint at least partially matches a fingerprint for an existing finding, the validation system 110 may determine if the new finding contains any update with respect to the existing finding. If no update, the validation system 110 may discard the new finding. If there is an update, the validation system 110 may update the medium 220 to include the update. Updates may include a line number change, or line content change, among other possibilities. The validation system 110 may track such historical developments or updates of same software issues.

Each validation system 110 may include one or more physical or logical devices (e.g., servers). For example, the validation system 110 may be a single device or server or may be configured as a distributed computer system including multiple servers, devices, or computers that interoperate to perform one or more of the processes and functionalities associated with the disclosed embodiments. In some embodiments, the validation system 110 may further include a peripheral interface, a transceiver, a mobile network interface in communication with the processor 210, a bus configured to facilitate communication between the various components of the validation system 110, and a power source configured to power one or more components of the validation system 110.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, and ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The processor 210 may be one or more known processing devices, such as a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The non-transitory computer readable medium 220 may contain an operating system ("OS") 225, a database 226 and a program 227. The non-transitory computer readable medium 220 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory computer readable medium 220. The non-transitory computer readable medium 220 may include one or more memory devices that store data and instructions used to perform one or more features of the disclosed embodiments. The non-transitory computer readable medium 220 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The non-transitory computer readable medium 220 may include software components that, when executed by the processor 210, perform one or more processes consistent with the disclosed embodiments. In some embodiments, the non-transitory computer readable medium 220 may include the database 226 to perform one or more of the processes and functionalities associated with the disclosed embodiments. The non-transitory computer readable medium 220 may include one or more programs 227 to perform one or more functions of the disclosed embodiments. Moreover, the processor 210 may execute one or more programs 227 located remotely from the validation system 110. For example, the validation system 110 may access one or more remote programs 227, that, when executed, perform functions related to disclosed embodiments.

The validation system 110 may also include one or more I/O devices 260 that may comprise one or more interfaces for receiving signals or input from devices and providing signals or output to one or more devices that allow data to be received and/or transmitted by the validation system 110. For example, the validation system 110 may include interface components, which may provide interfaces to one or more input devices, such as one or more keyboards, mouse devices, touch screens, track pads, trackballs, scroll wheels, digital cameras, microphones, sensors, and the like, that enable the validation system 110 to receive data from one or more users. The validation system 110 may include a display, a screen, a touchpad, or the like for displaying images, videos, data, or other information. The I/O devices 260 may include the graphical user interface 262.

In exemplary embodiments of the disclosed technology, the validation system 110 may include any number of hardware and/or software applications that are executed to facilitate any of the operations. The one or more I/O interfaces 260 may be utilized to receive or collect data and/or user instructions from a wide variety of input devices. Received data may be processed by one or more computer processors as desired in various implementations of the disclosed technology and/or stored in one or more memory devices.

Turning back to FIG. 1, the networks 190 may include a network of interconnected computing devices more commonly referred to as the internet. The network 190 may be of any suitable type, including individual connections via the internet such as cellular or WiFi networks. In some embodiments, the network 190 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network 190 may comprise any type of computer networking arrangement used to exchange data. For example, the network 190 may be the Internet, a private data network, virtual private network using a public network, and/or other suitable connection(s) that enables components in system environment 100 to send and receive information between the components of system 100. The network 190 may also include a public switched telephone network ("PSTN") and/or a wireless network. The network 190 may also include local network that comprises any type of computer networking arrangement used to exchange data in a localized area, such as WiFi, Bluetooth™ Ethernet, and other suitable network connections that enable components of system environment 100 to interact with one another.

According to some embodiments, the host server 192 may host websites, web portal or software application, data or software applications that may access and interact with the validation system 110. A website may be an internal page/site associated with an enterprise, or a publicly accessible website.

Exemplary Use Cases

The following example use case describes examples of implementations of the validation system 110. This is intended solely for explanatory purposes and not limitation.

FIG. 7 illustrates a screenshot 700 for operating the validation system 110 to perform SAST scans and OSA scans of application code. As shown in FIG. 7, by sending a request to the pictured "/assessment/static" endpoint, back-end scans may be orchestrated for all (or a subset of) enabled SAST tools 130 such as Fortify on Demand™ and Checkmarx™, and all enabled OSA tools 140 such as Whitesource™. The simplified interface shown in the screenshot 700 has two required inputs and two optional inputs (the remaining parameters and configurations etc. being handled automatically by the validation system 110), significantly lower than most individual tool integrations. The validation system 110 handles the rest of the required integration with various tools 120 behind the scenes, the required and optional inputs having been abstracted out for ease of use of the user.

Figure 8:
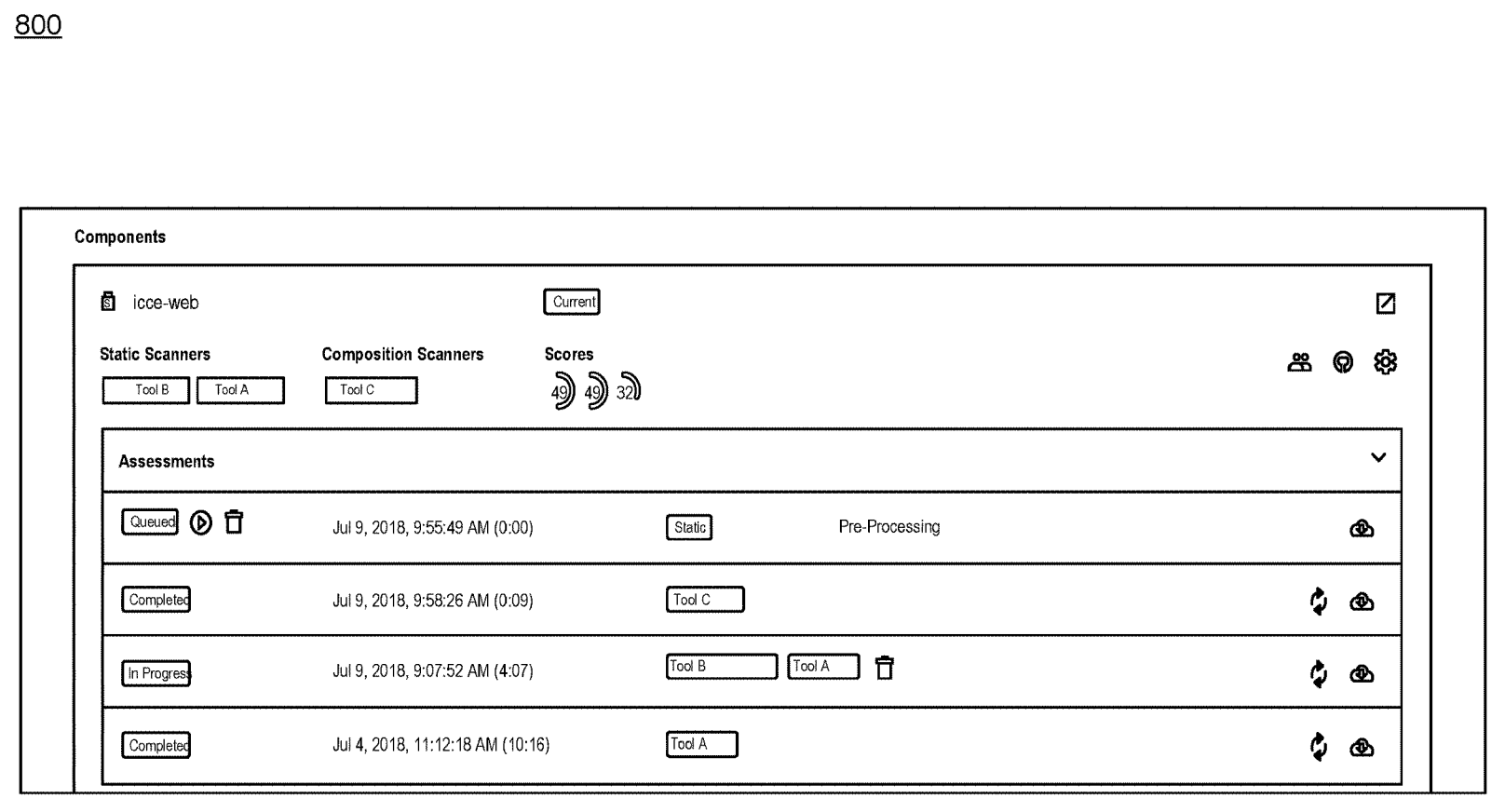

FIG. 8 illustrates a screenshot 800 of the graphical user interface 262 of the validation system 110, according to an example implementation. The screenshot 800 depicts a view in the validation system 110 for a given software project or application showing its scan history. As shown, events may be shown sorted in an order from newest to oldest. The oldest event shows a "Completed" assessment where a single scan performed by tool A was run. Thereafter, the screenshot 700 also shows another assessment where two scans performed by tool A and tool B are in progress. In parallel to those scans, another assessment shows a scan performed by tool C with a "Completed" status. For example, tool A may be Checkmarx™, tool B may be Fortify on Demand™, and tool C may be WhiteSource™. Lastly, an additional request, listed as "Queued," is on hold until the scans that are currently in progress have completed.

The validation system 110 may monitor scan statuses of all tools 120 from start to completion. Once all scans of an assessment have completed, the assessment is marked as "Completed." Upon assessment completion, individual scan results of each tool 120 may be combined into a unified finding view and presented by the validation system 110.

The screenshot 800 also shows the ability for admins to configure specific scanners. This may be automatically done as components are enrolled, but can be overridden by admins. As shown in FIG. 8, next to that configuration, category risk scores are shown. This set of three scores are outcomes of most recent scan results. The first category risk score is a static vulnerability score that represents a combined static analysis result. The second category risk score is an open source license score that represents a combined open source license analysis. The third category risk score is an open source vulnerability score that represents open source known vulnerabilities.

Figure 9:
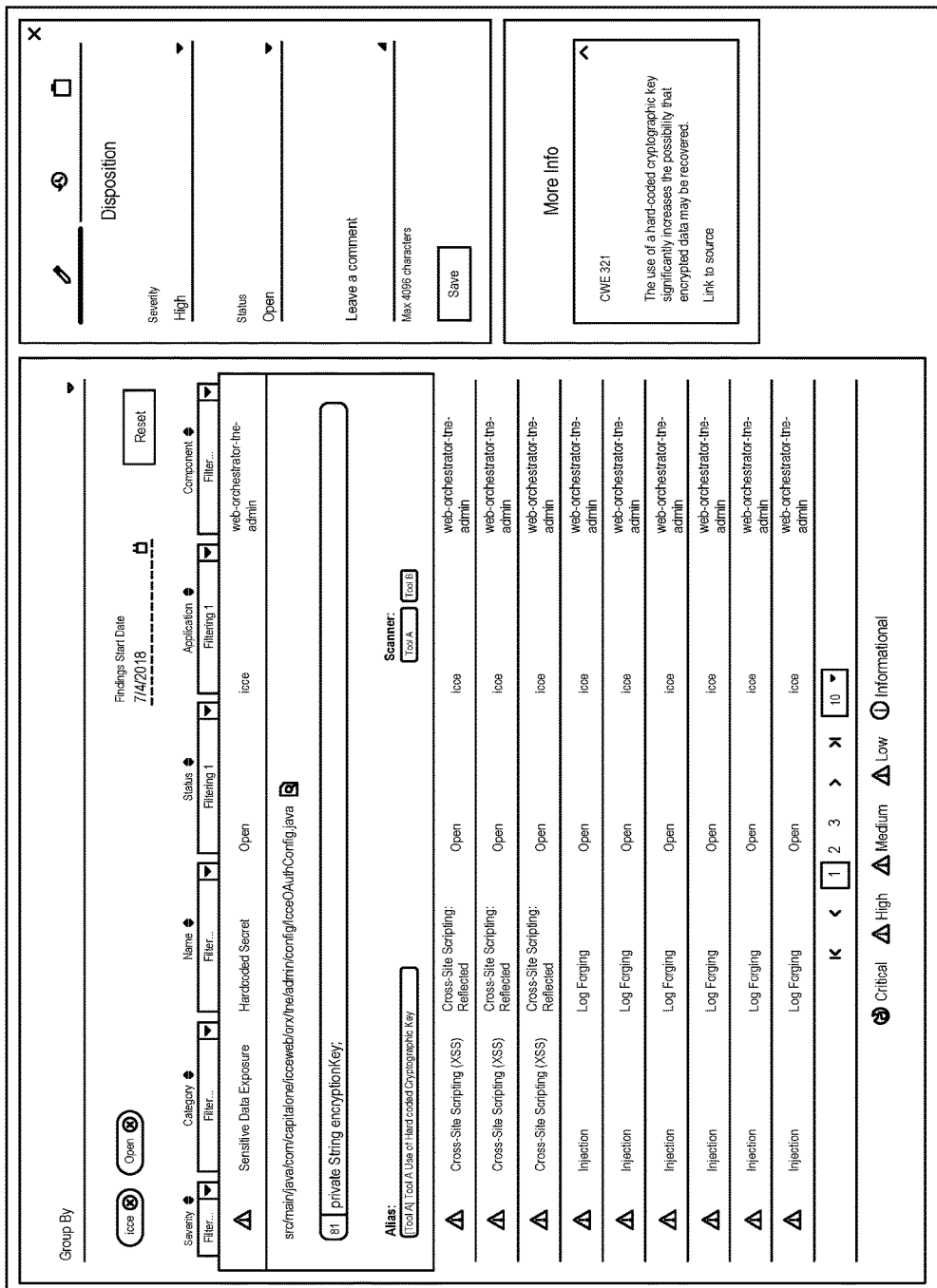
FIG. 9 is an additional example screenshot of the graphical user interface of the validation system according to one aspect of the disclosed technology.

FIG. 9 illustrates a screenshot 900 of the example graphical user interface 262 of the validation system 110, according to an example implementation. The screenshot 900 shows findings after each scan has finished. These findings are an aggregate scan result of multiple software security analysis tools 120. As shown in the screenshot 900, the first finding (e.g., a sensitive data exposure—hardcoded secret) was found by both two software security analysis tools: tool A and tool B. For examples, tool A may refer to Checkmarx™, and tool B may refer to Fortify on Demand™ (FOD). The shown results are filterable based on a category and name assigned to each result or finding. In some embodiments, the category and name may be based on a common internal taxonomy that may not directly correspond to a finding output by any one or more tools. After each tool yields its finding, the validation system 110 may through its de-duplication process determine that findings provided by each tool in fact refer to the same issue. Instead of creating separate records for the same issue, the validation system 110 may consolidate the findings by different tools as a single finding, as shown in the example of the first finding in FIG. 9.

The validation system 110 may unify various common fields, such as severity, category, and name to common internal taxonomy, rather than relying on CWE or some other external way to link them. The screenshot 900 illustrates a disposition side-bar where users may dispose findings, where disposition is handled across tools and across assessments/scans.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for validating software security analysis findings, comprising:
   a non-transitory computer readable medium for storing:
     a plurality of confidence scores designating confidence levels of a plurality of software security analysis tools of different categories;
     findings generated by each software security analysis tool; and
     a source truth dataset including criteria for validating characteristics of software security analysis findings; and
   a processor configured to:
     receive a first finding from a first software security analysis tool that performs a scan of application code;
     identify a first characteristic from the first finding;
     select, from the non-transitory computer readable medium, a criterion for validating the first characteristic;
     determine a first validity factor by determining whether the selected criterion is met;
     determine a second validity factor by retrieving, from the non-transitory computer readable medium, a confidence score associated with the first software security analysis tool;
     determine a third validity factor by determining a number of findings stored in the non-transitory computer readable medium that overlap with the first finding;
     determine a validity score for the first finding based on at least one of the first validity factor, the second validity factor and the third validity factor;
     determine whether the first finding is false positive by comparing the validity score to a predetermined validity threshold; and
     display the first finding on a graphical user interface when the first finding is true positive.

2. The system of claim 1, wherein the processor is configured to:
   update the source truth dataset stored in the non-transitory computer readable medium based on whether the first finding is false positive.

3. The system of claim 1, wherein the processor is configured to exclude the first finding from being displayed on the graphical user interface when the first finding is false positive.

4. The system of claim 1, wherein the processor is configured to:
   receive, via the graphical user interface, a disposition of the first finding entered by a user; and
   update the source truth dataset stored in the non-transitory computer readable medium based on the disposition.

5. The system of claim 4, wherein the processor is configured to exclude the first finding from being displayed on the graphical user interface when the disposition indicates that the first finding is false positive.

6. The system of claim 1, wherein the source truth dataset includes information of disposition of findings entered by a user.

7. The system of claim 1, wherein the processor is configured to update a scan rule of the first software security analysis tool to omit scanning the first characteristic when a plurality of findings having the first characteristic are false positive.

8. The system of claim 1, wherein each software security analysis tool belongs to one of the following categories:
   a first category of at least one software security analysis tool for performing Static Application Security Testing (SAST);
   a second category of at least one software security analysis tool for performing Dynamic Application Security Testing (DAST);
   a third category of at least one software security analysis tool for performing Open Source Analysis (OSA); and
   a fourth category of at least one software security analysis tool for performing Interactive Application Security Testing (IAST).

9. The system of claim 8, wherein a confidence score associated with a software security analysis tool of the first category is lower than a confidence score associated with a software security analysis tool of the third category.

10. The system of claim 8, wherein a confidence score associated with a software security analysis tool of the second category is lower than a confidence score associated with a software security analysis tool of the third category.

11. The system of claim 8, wherein each category is associated with a predetermined validity threshold.

12. The system of claim 11, wherein the predetermined validity thresholds associated with different categories are different.

13. The system of claim 1, wherein the selected criterion includes a requirement of presence of a second finding with a second characteristic with respect to the application code.

14. The system of claim 13, wherein the processor determines the first validity factor by determining whether the second finding with the second characteristic is present in any finding generated by any software security analysis tool that performs a scan on the application code.

15. The system of claim 13, wherein the processor determines the first validity factor by determining whether the second finding with the second characteristic is present in any finding generated by the first software security analysis tool that performs the scan of the application code.

16. The system of claim 1, wherein the non-transitory computer readable medium stores characteristic confidence scores indicating confidence levels of each software security analysis tool to correctly identify each characteristic of findings.

17. The system of claim 16, wherein the processor is configured to determine the validity score for the first finding based on a characteristic confidence score that indicates a confidence level of the first software security analysis tool to correctly identify the first characteristic.

18. The system of claim 1, wherein the third validity factor indicates an increase of likelihood of validity when there exists a plurality of findings produced by other software security analysis tools that overlap with the first finding.

19. A method for validating software security analysis findings, comprising:
   storing, by a non-transitory computer readable medium, a plurality of confidence scores designating confidence levels of a plurality of software security analysis tools of different categories;
   storing, by the non-transitory computer readable medium, findings generated by each software security analysis tool; and
   storing, by the non-transitory computer readable medium, a source truth dataset including criteria for validating characteristics of software security analysis findings;
   receiving, by a processor, a first finding from a first software security analysis tool that performs a scan of application code;
   identifying, by the processor, a first characteristic from the first finding;
   selecting, by the processor, from the non-transitory computer readable medium, a criterion for validating the first characteristic;
   determining, by the processor, a first validity factor by determining whether the selected criterion is met;
   determining, by the processor, a second validity factor by retrieving, from the non-transitory computer readable medium, the confidence score associated with the first software security analysis tool;
   determining, by the processor, a third validity factor by determining a number of findings stored in the non-transitory computer readable medium that overlap with the first finding;
   determining, by the processor, a validity score for the first finding based on at least one of the first validity factor, the second validity factor or the third validity factor;
   determining, by the processor, whether the first finding is false positive by comparing the validity score to a predetermined validity threshold; and
   displaying, by the processor, the first finding on a graphical user interface when the first finding is true positive.

20. The method of claim 19, further comprising:
   updating the source truth dataset stored in the non-transitory computer readable medium based on whether the first finding is false positive.

21. The method of claim 19, further comprising:
   receiving, via the graphical user interface, a disposition of the first finding entered by a user;
   updating the source truth dataset stored in the non-transitory computer readable medium based on the disposition, and
   excluding the first finding from being displayed on the graphical user interface when the disposition indicates that the first finding is false positive.

22. The method of claim 19, wherein each software security analysis tool belongs to one of the following categories:
   a first category of at least one software security analysis tool for performing Static Application Security Testing (SAST);
   a second category of at least one software security analysis tool for performing Dynamic Application Security Testing (DAST);
   a third category of at least one software security analysis tool for performing Open Source Analysis (OSA); and
   a fourth category of at least one software security analysis tool for performing Interactive Application Security Testing (IAST).

23. The method of claim 19, wherein the third validity factor indicates an increase of likelihood of validity when there exists a plurality of findings produced by other software security analysis tools that overlap with the first finding.

* * * * *